(12) United States Patent
Yonezawa

(10) Patent No.: US 11,953,699 B2
(45) Date of Patent: Apr. 9, 2024

(54) IMAGE DISPLAY APPARATUS

(71) Applicant: SONY CORPORATION, Tokyo (JP)

(72) Inventor: Takeshi Yonezawa, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 420 days.

(21) Appl. No.: 16/979,249

(22) PCT Filed: Feb. 27, 2019

(86) PCT No.: PCT/JP2019/007576
§ 371 (c)(1),
(2) Date: Sep. 9, 2020

(87) PCT Pub. No.: WO2019/181404
PCT Pub. Date: Sep. 26, 2019

(65) Prior Publication Data
US 2020/0400964 A1    Dec. 24, 2020

(30) Foreign Application Priority Data

Mar. 20, 2018 (JP) ................................. 2018-052352

(51) Int. Cl.
*G02B 27/10* (2006.01)
*G02B 3/00* (2006.01)
(Continued)

(52) U.S. Cl.
CPC ........... *G02B 27/106* (2013.01); *G02B 3/005* (2013.01); *G02B 27/30* (2013.01); *G06F 1/1609* (2013.01); *H04N 9/3152* (2013.01)

(58) Field of Classification Search
CPC ..... G02B 27/00–648; G02B 2027/0105–0198; G02B 3/00–14;
(Continued)

(56) References Cited

U.S. PATENT DOCUMENTS

2008/0094700 A1   4/2008  Uehara
2009/0207488 A1*  8/2009  Akiyama ............... G03B 21/60
                                                    359/455
(Continued)

FOREIGN PATENT DOCUMENTS

CN    1243577    2/2000
CN    1627472    6/2005
(Continued)

OTHER PUBLICATIONS

Extended European Search Report for European Patent Application No. 19770808.4, dated Feb. 23, 2021, 7 pages.
(Continued)

*Primary Examiner* — Bao-Luan Q Le
*Assistant Examiner* — Christopher A Lamb, II
(74) *Attorney, Agent, or Firm* — Sheridan Ross PC

(57) ABSTRACT

In order to achieve the above object, an image display apparatus according to an embodiment of the present technology includes a light source section and one or more optical components. The one or more optical components include an optical surface for dividing the light emitted from the light source into a plurality of light beams to be converged and a reflective surface for reflecting the plurality of light beams converged by the optical surface, and emit the plurality of light beams reflected by the reflective surface from the optical surface.

14 Claims, 9 Drawing Sheets

(51) Int. Cl.
*G02B 27/30* (2006.01)
*G06F 1/16* (2006.01)
*H04N 9/31* (2006.01)

(58) Field of Classification Search
CPC ...... G02B 5/00–32; G02B 17/00–0896; G02B 19/00–0095; G03B 21/00–64; H04N 9/31–3197; G06F 1/00–3296
See application file for complete search history.

(56) References Cited

U.S. PATENT DOCUMENTS

2011/0279743 A1* 11/2011 Kuroda .............. G03B 21/2073 349/8
2014/0055755 A1 2/2014 Fan
2017/0343856 A1* 11/2017 Grandclerc ....... G02F 1/133605

FOREIGN PATENT DOCUMENTS

| | | |
|---|---|---|
| CN | 101046607 | 10/2007 |
| CN | 101487928 | 7/2009 |
| CN | 102033407 | 4/2011 |
| CN | 102540679 | 7/2012 |
| CN | 102736383 | 10/2012 |
| CN | 102902146 | 1/2013 |
| CN | 103775869 | 5/2014 |
| CN | 106444255 | 2/2017 |
| CN | 107797296 | 3/2018 |
| EP | 2048537 | 4/2009 |
| JP | H10-082973 | 3/1998 |
| JP | 2007316393 A | 12/2007 |
| JP | 2008-134617 | 6/2008 |
| JP | 2009198941 A | 9/2009 |
| JP | 2009210853 A | 9/2009 |
| JP | 2009-237020 | 10/2009 |
| JP | 2013540282 A | 10/2013 |
| JP | 2015-227998 | 12/2015 |
| JP | 2016034015 A | 3/2016 |
| JP | 2017-122838 | 7/2017 |
| WO | WO-2014093085 A1 * | 6/2014 ......... G02B 27/0961 |
| WO | WO 2014/093085 | 12/2014 |

OTHER PUBLICATIONS

International Search Report prepared by the Japan Patent Office dated Mar. 25, 2019, for International Application No. PCT/JP2019/007576.

* cited by examiner

IMAGE DISPLAY APPARATUS

CROSS REFERENCE TO RELATED APPLICATIONS

This application is a national stage application under 35 U.S.C. 371 and claims the benefit of PCT Application No. PCT/JP2019/007576 having an international filing date of 27 Feb. 2019, which designated the United States, which PCT application claimed the benefit of Japanese Patent Application No. 2018-052352 filed 20 Mar. 2018, the entire disclosures of each of which are incorporated herein by reference.

TECHNICAL FIELD

The present technology relates to an image display apparatus.

BACKGROUND ART

Patent Document 1 discloses an illumination optical system for uniformly illuminating an illuminated surface, and a projection type display apparatus such as a liquid crystal projector using the same. The illumination optical system described in Patent Document 1 includes a reflecting plate including a concave mirror array, a lens array, and a condenser lens. With this configuration, it is said that it is possible to apparently omit a first fly-eye lens in an integrator optical system and to uniformly irradiate an image forming element with light emitted from a light source without collimating. It is also said that the illumination optical system can realize a compact projection type display apparatus (see Patent Document 1, specification paragraphs [0024], [0027], etc.)

CITATION LIST

Patent Literature

Patent Literature 1: Japanese Patent Application Laid-open No. 2001-75173

DISCLOSURE OF INVENTION

Technical Problem

Thus, in various image display apparatuses such as a projector, a technique that enables to realize an apparatus having a reduced size is required.

In view of the above circumstances, an object of the present technology is to provide an image display apparatus capable of realizing the apparatus having a reduced size.

Solution to Problem

In order to achieve the above object, an image display apparatus according to an embodiment of the present technology includes a light source section and one or more optical components.

The one or more optical components include an optical surface for dividing the light emitted from the light source into a plurality of light beams to be converged and a reflective surface for reflecting the plurality of light beams converged by the optical surface, and emit the plurality of light beams reflected by the reflective surface from the optical surface.

The image display apparatus includes the optical component having the optical surface and the reflective surface. The optical surface of the optical component divides the light from the light source into the plurality of light beams to be converged and the reflective surface reflects the light beams. The plurality of light beams reflected by the reflective surface is emitted from the optical surface. This makes it possible to realize the apparatus having a reduced size.

The optical surface may be configured of a lens surface of each of a plurality of lenses arranged two-dimensionally. In this case, the reflective surface may reflect the light beam converged by each of the plurality of lenses toward the lens surface of each of the plurality of lenses.

The reflective surface may be arranged so as to position a focal plane of each of the plurality of lenses in the vicinity of each surface of the plurality of lenses.

The optical surface and the reflective surface may be arranged to face each other.

The optical surface and the reflective surface may be integrally formed.

The image display apparatus may further include a collimating optical system for converting the light emitted from the emitting section into collimated light and guiding the collimated light into the optical surface.

The image display apparatus may further include an image display element and an illumination optical system.

The illumination optical system guides the plurality of the light beams emitted from the optical component to the image display surface of the image display element.

The illumination optical system may superimpose the plurality of the light beams emitted from the optical component on the image display surface.

The reflective surface may have a plurality of reflective areas that reflect each of the plurality of light beams.

The plurality of reflective areas may have an equal shape each other.

Each of the plurality of reflective areas may have a planar shape.

The light source section may have a plurality of light sources arranged at different positions from each other. In this case, each of the plurality of reflective areas may have a shape corresponding to a positional relationship of the plurality of light sources.

Each of the plurality of reflective areas may have a planar portion in a planar shape formed in a center of the reflective area, and a tapered surface portion extending obliquely from the center of the reflective area to a peripheral edge.

The optical components are arranged so as to have different angles from each other corresponding to the positions of the plurality of light sources and may have a plurality of reflective surfaces, each of which reflects the plurality of light beams emitted from the corresponding light source of the plurality of light sources and converged by the optical surface.

The one or more optical components may include first and second optical components. In this case, the image display apparatus may further include a beam splitter that splits the light emitted from the light source section, emits the light to each of the first and second optical components, and combines the plurality of light beams emitted from each of the first and second optical components.

Advantageous Effects of Invention

As described above, the present technology makes it possible to realize the apparatus having a reduced size. It should be noted that the effects described here are not necessarily limitative and may be any of effects described in the present disclosure.

MODES FOR CARRYING OUT THE INVENTION

Hereinafter, an embodiment of the present disclosure will be described with reference to the drawings.

First Embodiment

[Image Display Apparatus]

Figure 1:
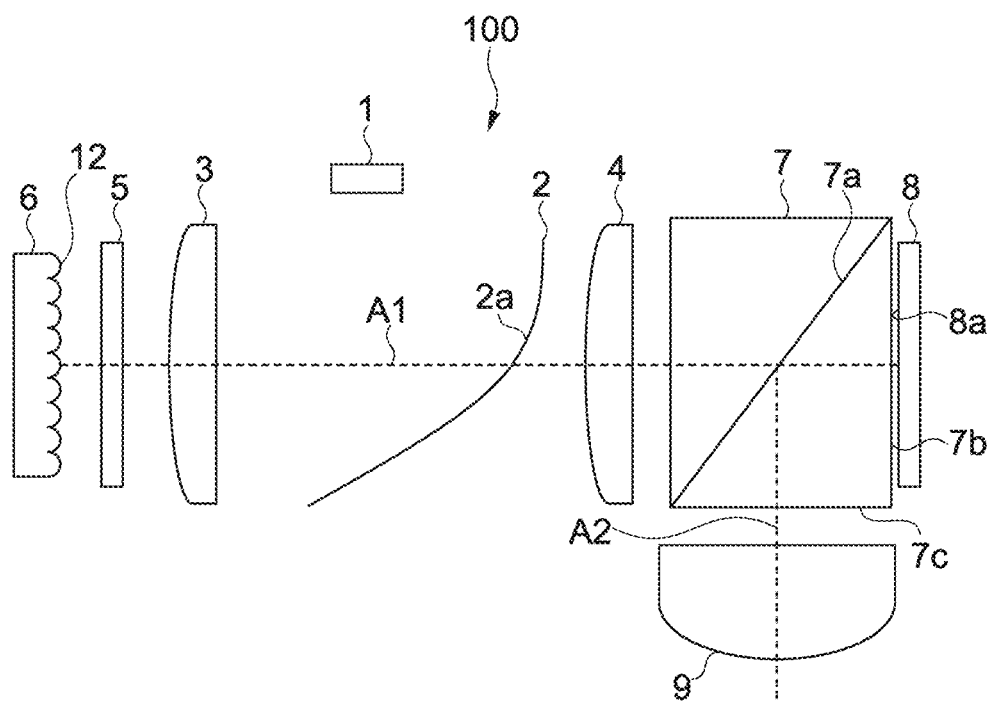
FIG. 1 is a schematic diagram showing a configuration example of an optical system of an image display apparatus according to a first embodiment of the present technology.

FIG. 1 is a diagram schematically showing a configuration example of an optical system of an image display apparatus according to a first embodiment of the present technology. The image display apparatus 100 includes a light source 1, a concave reflecting mirror 2, condenser lenses 3 and 4, a quarter-wave plate (QWP) 5, a reflective fly-eye lens 6, a polarizing beam splitter (PBS) 7, an image display element 8, and a projection lens 9.

As shown in FIG. 1, along the first reference axis A1 extending in one direction, the reflective fly-eye lens 6, the QWP 5, the condenser lens 3, the concave reflecting mirror 2, the condenser lens 4, the PBS 7, and the image display element 8 are arranged in this order.

The reflective fly-eye lens 6, the QWP 5, the condenser lenses 3 and 4, and the PBS 7 are arranged such that an axis passing through a center of the optical surface exhibiting optical characteristics such as the lens surface or the reflective surface (which may be referred to as optical axis of respective members) substantially coincides with a first reference axis A1.

The concave reflecting mirror 2 is arranged such that a predetermined reflection characteristic is exhibited by using the first reference axis A1 as a reference. The image display element 8 is arranged such that a center of the image display surface 8a is aligned with the first reference axis A1. The first reference axis A1 is an optical axis of light traveling from the reflective fly-eye lens 6 to the image-display surface 8a.

The projection lens 9 is arranged on a second reference axis A2 perpendicular to the first reference axis A1 and passing through a center of an optical surface 7a of the PBS 7. The projection lens 9 is arranged such that its optical axis substantially coincides with the second reference axis A2. The second reference axis A2 becomes an optical axis of image light emitted from the image displaying surface 8a and reflected by the optical surface 7a of the PBS 7.

The light source 1 is a white light source, and a laser light source or an LED is used, for example. Needless to say that other light sources such as a mercury lamp and a xenon lamp may be used. In the present embodiment, the light source 1 corresponds to the light source section.

The concave reflecting mirror 2 reflects white light emitted from the light source 1 toward the condenser lens 3. In the present embodiment, as the concave reflecting mirror 2, a wire grid polarizing film is used. Therefore, with respect to the optical surface 2a of the concave reflecting mirror 2, light of a predetermined polarization state (here S-polarized light) is reflected, and light of the other polarization state (here P-polarized light). Therefore, the concave reflecting mirror 2 functions as a polarizing element. Needless to say that the concave reflecting mirror 2 may be formed by the polarizing element other than the wire grid polarizing film.

The condenser lens 3 condenses and emits the white light reflected by the concave reflecting mirror 2. In this embodiment, the condenser lens 3 converts the white light reflected by the concave reflecting mirror 2 into collimated light (parallel light). The collimated white light is then emitted along the first reference axis A1 toward the QWP 5 and the reflective fly-eye lens 6.

Therefore, in the present embodiment, the concave reflecting mirror 2 and the condenser lens 3 realizes the collimating optical system that the white light emitted from the light source 1 is converted into the collimated light and is guided to an optical surface 12 of the reflective fly-eye lens 6.

By using the concave reflecting mirror 2 having the optical surface 2a in a concave shape, it becomes possible to suppress an optical load of the condenser lens 3, to thereby reducing the size of the condenser lens 3. It also becomes possible to shorten an optical path length of the white light. As a result, it becomes possible to realize the image display apparatus 100 having a reduced size.

The QWP 5 provides the polarization plane of the incident light with a 90° phase differential. The specific configuration of the QWP 5 is not limited, and may be arbitrarily designed.

Figure 2:
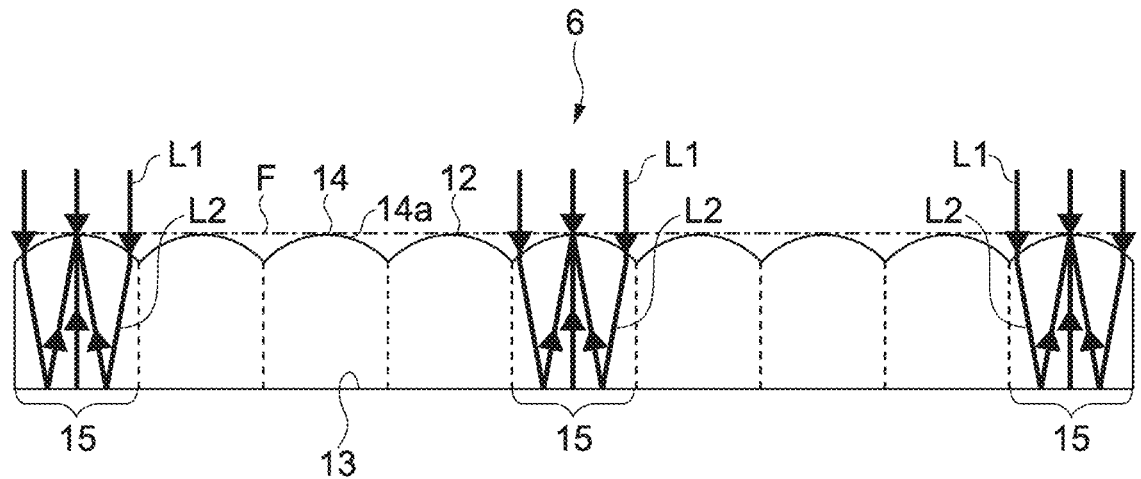
FIG. 2 is a schematic diagram showing a configuration example of a reflective fly-eye lens shown in FIG. 1.

FIG. 2 is a schematic diagram showing a configuration example of the reflective fly-eye lens 6. The reflective fly-eye lens 6 has the optical surface 12 and the reflective surface 13.

The optical surface 12 is constituted by respective lens surfaces 14a of the plurality of lenses 14 arranged two-dimensionally. The plurality of lenses 14 has a substantially equal shape each other. Accordingly, the plurality of lens surfaces 14a also has a substantially equal shape.

Also the plurality of lenses 14 is formed so as to face the same direction on substantially the same plane. Therefore, each optical axis passing through a center of each lens surface 14a extends in the same direction. Also, respective positions of tops of the lens surfaces 14a are also the same. Therefore, the focal plane of each lens 14 (plane perpendicular to optical axis including focal point) will be configured at the same position.

The reflective surface 13 has a planar shape and is arranged so as to face the optical surface 12. In the present embodiment, the reflective surface 13 is arranged so as to position each focal plane F of the plurality of lenses 14 in the vicinity of each surface of the plurality of lens surfaces 14a. That is, the reflective surface 13 is arranged at a position about half distant from the focal length of the lens 14 from each lens 14. The reflective surface 13 is configured in common in one plane with respect to the plurality of lenses 14 and is arranged at a position with which the focal plane F of each lens 14 is roughly matched with a surface of each lens surface 14a.

As shown in FIG. 2, the reflective surface 13 has a plurality of reflecting areas 15 corresponding to the plurality of lenses 14. With respect to one lens 14 (lens surface 14a), one reflective area 15 is arranged. The plurality of reflective areas 15 has an equal shape each other and has a planar shape in the present embodiment.

When the collimated light L1 is entered on the optical surface 12 of the reflective fly-eye lens 6, the collimated light L1 is divided into a plurality of light beams L2 and condensed by each of the plurality of lenses 14. As described above, the reflective surface 13 is arranged at a position approximately half the focal length of the lens 14 from each lens 14. Therefore, a plurality of light beams L2 divided is reflected toward each lens surface 14a by the reflecting area 15 of the reflective surface 13 while being condensed, and is condensed and emitted in the vicinity of each lens surface 14a.

In the present embodiment, the reflective fly-eye lens 6 functions as an optical component that has an optical surface that divides the light emitted from the light source section into a plurality of light beams and condenses the light and a reflective surface that reflects the plurality of light beams converged by the optical surface, and emits the plurality of light beams reflected by the reflective surface from the optical surface.

In the present embodiment, the reflective fly eye-lens 6 is formed as one component. Therefore, the optical surface 12 and the reflective surface 13 are integrally formed. For example, the reflective fly-eye lens 6 can be easily formed by glass molding, injection molding using a transparent resin material, or the like. It should be appreciated that any other method may be used, such as cutting. Note that a reflective film or the like may be formed on the reflective surface 13 from outside.

Returning to FIG. 1, the condenser lens 4 condenses the plurality of light beams emitted from the reflective fly-eye lens 6. The PBS 7 is a prismatic beam splitter, which splits the incident light on the basis of the polarization state of the incident light by the optical surface 7a. In the present embodiment, it is designed to have a high reflectance in the S-polarized light with respect to the optical surface 7a and a high transmittance in the P-polarized light.

The reflective image display element 8 is arranged facing the first plane 7b perpendicular to the first reference axis A1 of the PBS 7. As the image display element 8, for example, a high resolution and an ultra-compact micro display are used. For example, a reflective liquid crystal panel, a digital micromirror device (DMD) DLP, an organic electroluminescence (Electro-Luminescence panels), and the like can be employed. It should be appreciated that the present technology is applicable to an image display element that is not included in a micro display or other types of image display elements.

In this embodiment, a color filter is mounted on the image display element 8, a sub-pixel of RGB (sub-pixel) is arranged for one pixel. When the white light is irradiated to the image display surface 8a, the sub-pixel of RGB modulates the white light on the basis of the image signal including the image information of each color of RGB. The image light including each modulated light of RGB is emitted from the image display surface 8a.

The projection lens 9 is arranged so as to face the second surface 7c perpendicular to the second reference axes A2 of the PBS 7. The projection lens 9 projects the image light generated by the image display element 8 on a screen or the like. The specific configuration of the projection lens 9 is not limited and may be arbitrarily designed.

Figure 3A:
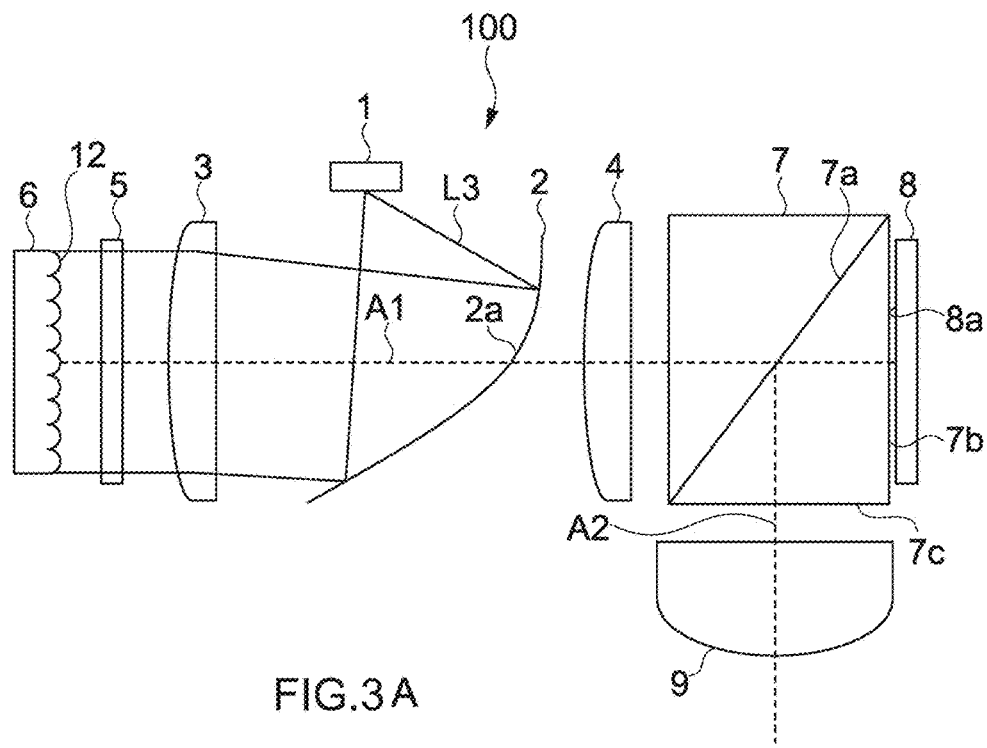
FIGS. 3A and 3B are diagrams for explaining an optical path on which the image is projected.
Figure 3B:
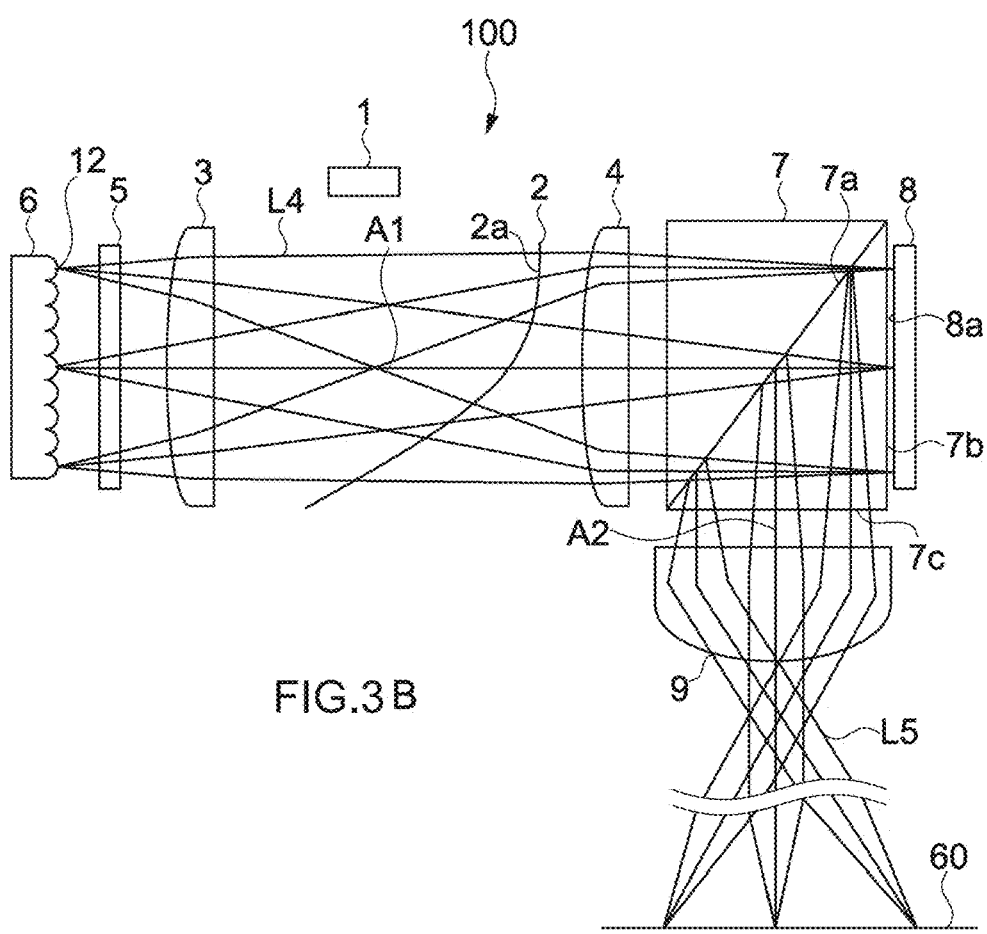

FIGS. 3A and 3B are diagrams for explaining an optical path on which the image is projected. As shown in FIG. 3A, white light L3 is emitted from the light source 1 toward the concave reflecting mirror 2. At this time, a polarization state of the white light L3 may be matched with the optical plane 2a of the concave reflecting mirror 2 by using a polarizing plate or the like so as to provide S-polarized light with respect to the optical plane 2a of the concave reflecting mirror 2. This makes it possible to suppress the loss of light (decrease in amount of light) and to improve brightness.

With the concave reflecting mirror 2 and the condenser lens 3, the white light L3 is converted into collimated light and is emitted to the QWP 5. By the QWP 5, the polarization state of the white light L3 is changed and emitted to the reflective fly-eye lens 6.

As described with reference to FIG. 2, by the plurality of lens surfaces 14a included in the optical surface 12 of the reflective fly-eye lens 6, the white light L3 (corresponding to L1 in FIG. 2) is divided into the plurality of light beams L2 and is condensed. The plurality of light beams L2 being condensed is reflected on the reflecting area 15 of the reflective surface 13 and condensed in the vicinity of the lens surface 14a. Therefore, in the vicinity of the lens surface 14a, the image of the light source 1 is imaged. The plurality of light beams L2 reflected by the reflecting area 15 of the reflective surface 13 is emitted from the plurality of lens surfaces 14a.

Hereinafter, in the illustrated FIG. 3B, a plurality of light beams emitted from the optical surface 12 of the reflective fly-eye lens 6 is denoted as a plurality of light beams L4. The plurality of light beams L4 emitted from the reflective fly-eye lens 6 is changed in the polarization state by the QWP 5. Since the white light L3 is transmitted through the QWP 5 twice, the polarization direction of the light is rotated by 90°.

Thus, the polarization state of the plurality of light beams L4 becomes the P-polarized light with respect to the optical plane 2a of the concave reflecting mirror 2. Therefore, the plurality of light beams L4 emitted from the reflective fly eye lens 6 is condensed by the condenser lens 3 and then is transmitted through the concave reflecting mirror 2.

The plurality of light beams L4 transmitted through the concave reflecting mirror 2 is condensed by the condenser lens 4, is transmitted through the optical surface 7a of the PBS 7, and is irradiated to the image display element 8. Therefore, the optical system is appropriately designed such that the P-polarized light with respect to the optical surface 2a of the concave reflecting mirror 2 becomes also the P-polarized light with respect to the optical surface 7a of the PBS 7, for example. Alternatively, the polarization states may be controlled by a polarizing element such as a half-wave plate so that the plurality of light beams L4 transmitted through the concave reflecting mirror 2 becomes also P-polarized light with respect to the optical surface 7a of the PBS 7.

As shown in FIG. 3B, the plurality of light beams L4 emitted from the reflective fly eye lens 6 is irradiated so as to be superimposed on the image display surface 8a of the image display element 8. That is, in the present embodiment, the a plurality of light beams L4 is superimposed on the image display surface 8a using the image of the light source 1 as the secondary light source that is condensed by the lens 14, is reflected by the reflective area 15 of the reflective surface 13, and imaged again on near the lens surface 14a. Thus, it becomes possible to irradiate the white light having the uniformed brightness (intensity) to the image display surface 8a.

In the present embodiment, it realizes the illumination optical system for guiding the plurality of light beams emitted from the optical component to the image display surface of the image display element by the reflective fly-eye lens 6, the QWP 5, the condenser lenses 3 and 4, and the PBS 7. With this illumination optical system, the plurality of light beams L4 emitted from the reflective fly eye lens 6 is superimposed on the image display surface 8a.

Therefore, in the present embodiment, the condenser lens 3 also functions as the collimating optical system as well as the illumination optical system. In addition, the reflective fly-eye lens 6 has both of a function of dividing the white light L3 into the plurality of light beams and a function of the illumination optical system.

Specific configurations of the collimating optical system and the illumination optical system are not limited and may be arbitrarily designed. For example, by appropriately designing the concave reflecting mirror 2, it is also possible to omit the condenser lens 3, etc. Needless to say, in this case, there is a possibility that a design for realizing the function as the illumination optical system will be newly required.

The image light L5 including the modulated light of the respective colors of RGB is emitted from the image display surface 8a of the image display element 8. The P-polarized components of the image light L5 are reflected by the optical surface 7a of the PBS 7 and are emitted from the second surface 7c along the second reference axis A2. The image light L5 emitted from the second surface 7c is projected on a projection object 60 such as a screen by the projection lens 9. In this way, a full-color image is displayed.

Note that an image display element 8 that does not mount a color filter, and a color wheel may be provided. In this case, through the color wheel, each color light of RGB is generated from the white light and is irradiated to the image display surface 8a in a time division manner. In conformity with the timing, each color light is modulated on the basis of the image signal including the image information about each color of RGB, and the image light of each color (modulated light) is generated. The generated image light L5 of each color is reflected by the optical surface 7a of the PBS 7 and projected by the projection lens 9. Accordingly, the image light L5 of each color of RGB will be projected in a time division manner. Even in such a configuration, it is possible to display a full-color image.

As described above, in the image display apparatus 100 according to the present embodiment, the reflective fly-eye lens 6 having the optical surface 12 and the reflective surface 13 are mounted. The white light L3 from the light source 1 is divided into the plurality of light beams L4 by the optical surface 12 of the reflective fly eye lens 6, is condensed, and is reflected by the reflective surface 13. The plurality of light beams L4 reflected by the reflective surface 13 is emitted from the optical surface 12. This makes it possible to realize the image display apparatus 100 having a reduced size.

For example, light pipes (also called as rods) and two fly-eye lenses may be used for the illumination system to improve the efficiency of the illumination and ensure uniformity of the illumination image. If such a configuration is employed, since the optical system becomes longer, it is difficult to reduce the size of the apparatus. In particular, if the illumination system is constituted by a conventional fly-eye optical system, it is advantageous for improvement of the illumination efficiency, but the size reduction of the apparatus is a problem.

In the illumination optical system described in the above-described Patent Document 1, it is said that it is possible to apparently omit a first fly-eye lens in an integrator optical system, but a second fly-eye lens group is required, and problems still remain regarding the integration of the optical system.

In the present embodiment, by using the reflective fly-eye lens 6, it is possible to significantly reduce the length of the optical system while exhibiting a high illumination efficiency comparable to that of the conventional fly-eye optical system. As a result, it is possible to realize the image display apparatus 100 having a reduced size, and it is very advantageous for application to eyewear, for example. Further, by using the reflective fly-eye lens 6, it also becomes possible to reduce the number of components and to reduce the cost.

It should be appreciated that the present technology is not limited to eyewear, and can be applied to various apparatuses capable of displaying images. For example, a projector, a TV, a notebook PC, a tablet terminal, a smart phone, a digitizer, a PDA (Personal Digital Assistants), a portable AV player, a digital still camera, a camcorder, a gaming machine, an electronic book terminal, an ATM (Automatic Teller Machine), a station ticket vending machine, a car navigation system, or the like may be configured as an image display apparatus according to the present technology.

Second Embodiment

An image display apparatus according to a second embodiment of the present technology will be described. In the following description, the description of the same configurations as those of the image display apparatus 100 described in the above embodiment will be omitted or simplified.

Figure 4:
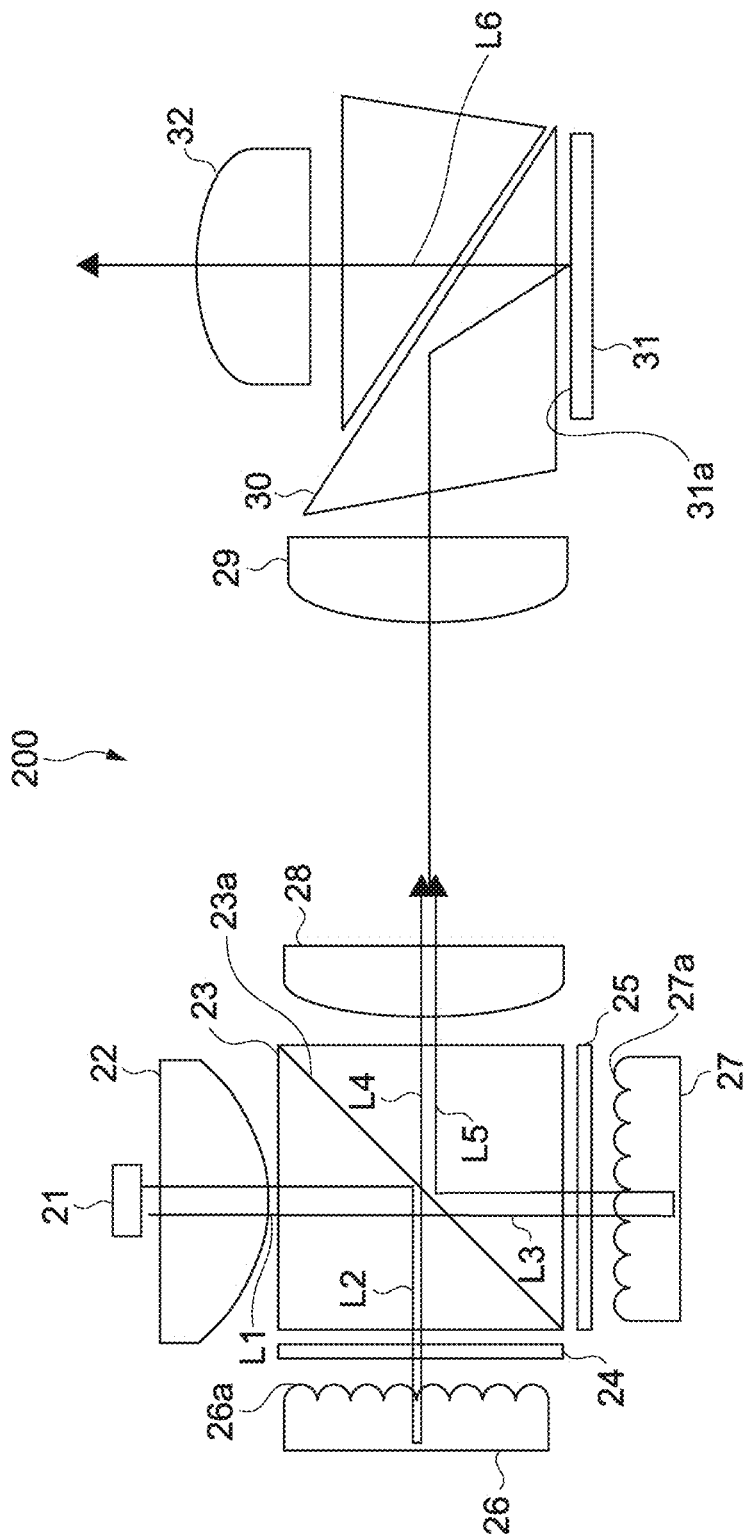
FIG. 4 is a schematic diagram showing a configuration example of an optical system of an image display apparatus according to a second embodiment.

FIG. 4 is a diagram schematically showing a configuration example of an optical system of the image display apparatus 200 according to the present embodiment. The image display apparatus 200 includes a light source 21, a collimating lens 22, a PBS 23, QWPs 24 and 25, a first reflective fly-eye lens 26, a second reflective fly-eye lens 27, a condenser lenses 28 and 29, a TIR prism (internal total reflection prism) 30, an image display element 31, and a projection lens 32.

Main differences between the image display apparatus 200 according to the present embodiment and the image display apparatus 100 according to the first embodiment are as follows.

(1) The collimating optical system that converts the white light L1 emitted from the light source 21 into collimated light and guides the collimated light to the optical surfaces 26a and 27b of the first and second reflective fly-eye lenses 26 and 27 is realized by the collimating lens 22 and the PBS 23.

(2) Two reflective fly-eye lenses (first and second reflective fly-eye lenses 26 and 27) are used.

(3) As the illumination optical system, the TIR prism 30 is used.

The white light L1 emitted from the light source 21 is collimated by the collimating lens 22, and then divided by the optical surface 23a of the PBS 23. In the present embodiment, the S-polarized component L2 of the white light L1 is reflected by the optical surface 23a and is guided to the first reflective fly-eye lens 26. The P polarization component L3 of the white light L1 is transmitted through the optical surface 23a and is guided to the second reflective fly-eye lens 27.

The plurality of light beams L4 is emitted from the optical surface 26a of the first reflective fly-eye lens 26. The plurality of light beams L4 becomes P-polarized light because it is transmitted through the QWP 24 twice and transmits through the optical surface 23a of the PBS 23.

The plurality of light beams L5 is emitted from the optical surface 27a of the second reflective fly-eye lens 27. The plurality of light beams L5 becomes S-polarized light because it is transmitted through the QWP 25 twice and is reflected by the optical surface 23a of the PBS 23. Thus, the plurality of light beams L4 emitted from the first reflective fly eye lens 26 and the plurality of light beams L5 emitted from the second reflective fly eye lens 27 are combined coaxially.

The plurality of coaxially combined light beams L4 and L5 are superimposed on the image display surface 31a of the image display element 31 via the condenser lenses 28 and 29 and the TIR prism 30. Image light L6 is generated by the image display element 31, and is emitted from the image display surface 31a. The image light L6 emitted from the image display surface 31a is projected on a screen or the like via the TIR prism 30 and the projection lens 32. Note that any of a configuration including a color filter, and a configuration using the color wheel can be employed.

Thus, in the present embodiment, the PBS 23 is arranged as the collimating optical system, and the two white lights L2 and L3 divided by the PBS 23 are guided to the two reflective fly-eye lenses (first and second reflective fly-eye lenses 26 and 27). Then, the plurality of light beams L4 and L5 are emitted by the first and second reflective fly-eye lenses 26 and 27. This makes it possible to suppress a loss of light (decrease in amount of light) and to improve the brightness.

As the illumination optical system, by using the TIR prism 30, it is possible to shorten the optical path length and to reduce the size of the apparatus.

In the present embodiment, the first and second reflective fly-eye lenses 26 and 27 correspond to the first and second optical components included in one or more optical components. In addition, the PBS 23 functions as a beam splitter that divides the light emitted from the light source section to emit to each of the first and second optical components and combines the plurality of light beams emitted from each of the first and second optical components. Note that the beam splitter according to the present technology may be realized by an optical component different from the PBS.

Figure 5:
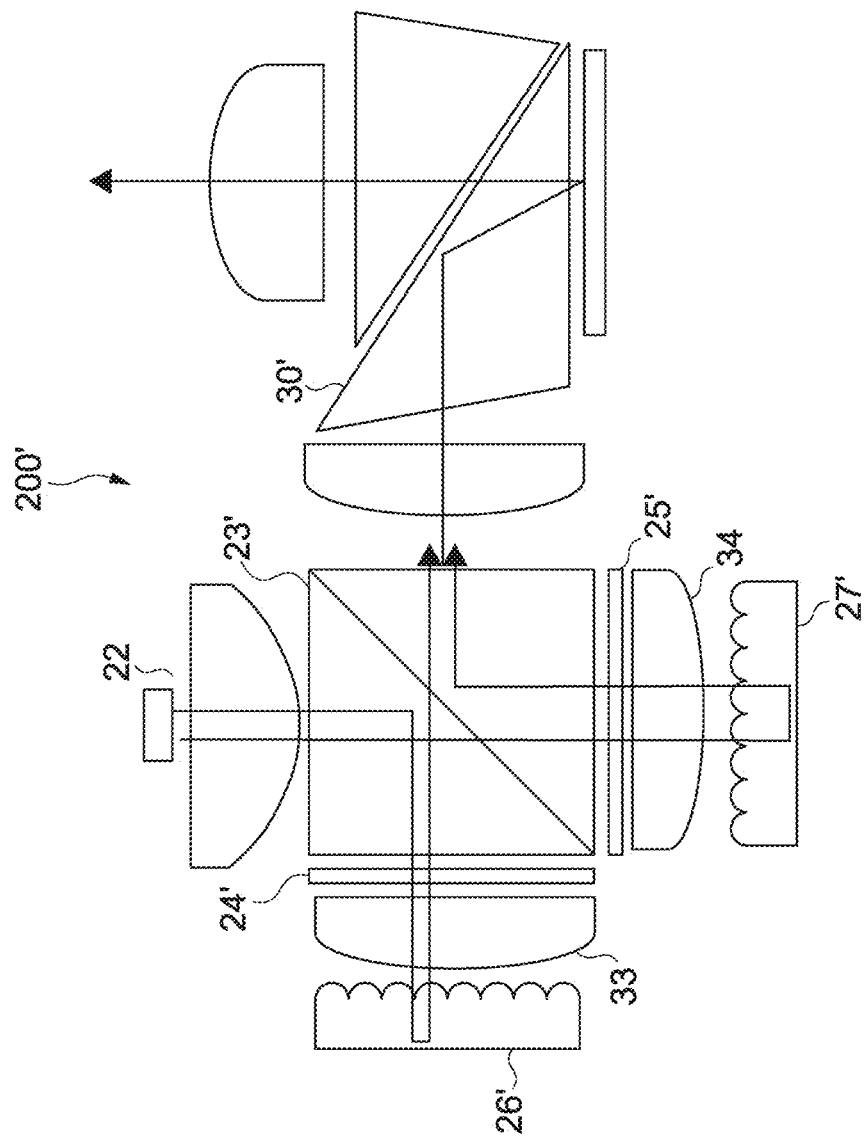
FIG. 5 is a schematic diagram showing a modification of the image display apparatus shown in FIG. 4.

FIG. 5 is a schematic diagram showing a modification of the image display apparatus 200 shown in FIG. 4. In an image display apparatus 200', a condenser lens 33 is arranged between a first reflective fly-eye lens 26' and a QWP 24'. A condenser lens 34 is also arranged between a second reflective fly eye lens 27' and a QWP25'.

This makes it possible to reduce the number of condenser lenses arranged between a PBS 23' and a TIR prism 30' and to shorten the distance between the PBS 23' and the TIR prism 30', for example. This makes it possible to realize the image display apparatus 200' having a reduced size.

Third Embodiment

Figure 6:
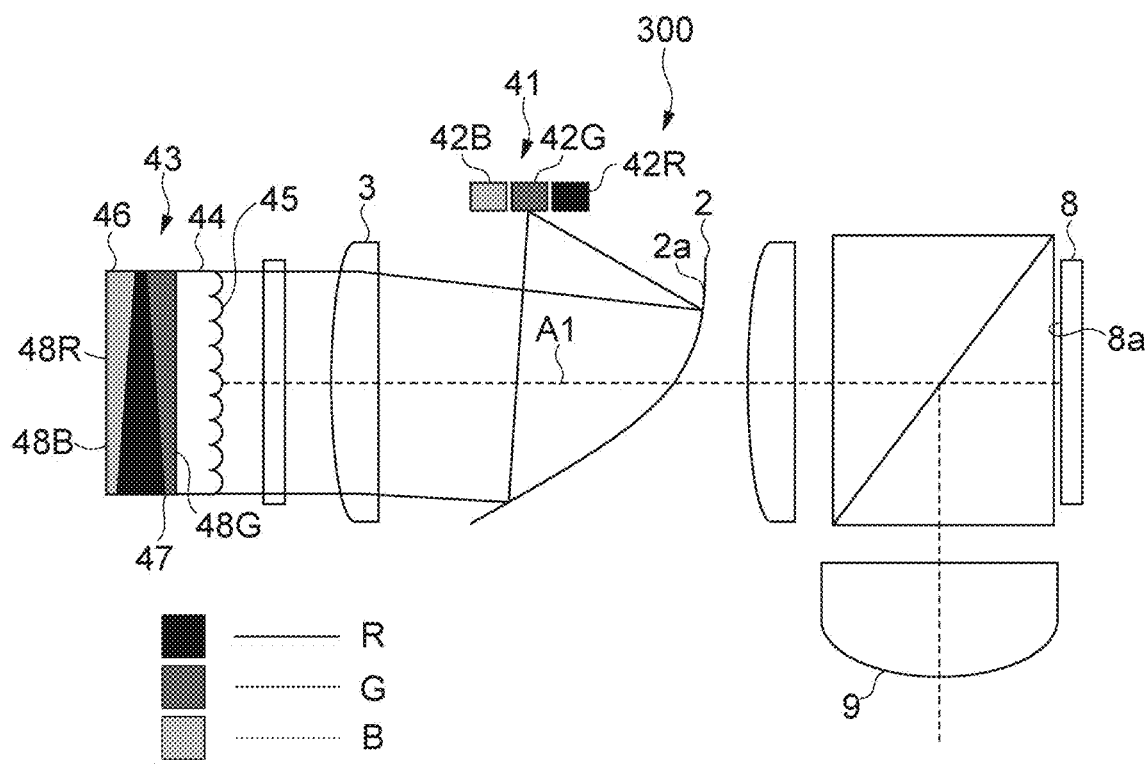
FIG. 6 is a schematic diagram showing a configuration example of an optical system of an image display apparatus according to a third embodiment.

FIG. 6 is a diagram schematically showing a configuration example of an optical system of an image display apparatus 300 according to a third embodiment of the present technology. In the image display apparatus 300, as compared with the image display apparatus 100 according to the first embodiment, configurations of a light source section 41 and a reflective fly-eye lens 43 are different. The rest of the configurations is equal to those of the image display apparatus 100, and therefore, the same reference numerals as those in FIG. 1 will be used as appropriate to explain the configuration.

In the image display apparatus 300, a color image is projected by a field sequential method. That is, each light of RGB is irradiated on the image display surface 8a of the image display element 8 in a time-division manner. In conformity with the timing, each color light is modulated on the basis of the image signal including the image information about each color of RGB, and the image light of each color (modulated light) is generated. The generated image light of each color is projected in time division manner by the projection lens 9.

As shown in FIG. 6, the light source section 41 is configured as an LED array light source including a red LED 42R, a green LED 42G, and a blue LED 42B. The red LED 42R, the green LED 42G, and the blue LED 42B are arranged at different positions from each other with respect to the concave reflecting mirror 2. In the present embodiment, the red LED 42R, the green LED 42G, and the blue LED 42B correspond to the plurality of light sources arranged at different positions from each other.

The reflective fly-eye lens 43 has a lens body 44 and a dichroic wedge plate 46. The lens body 44 has a configuration substantially equal to the reflective fly-eye lens 6 shown in FIG. 1 and has an optical surface 45 having a plurality of lens surfaces.

The dichroic wedge plate 46 is connected to a rear surface 47 of the lens body 44 opposite the optical surface 45. The rear surface 47 is a surface corresponding to the reflective surface 13 of the reflective fly-eye lens 6 shown in FIG. 1, but is not used as a reflective surface in the present embodiment. Note that an antireflection film or the like may be formed on this rear surface 47.

The dichroic wedge plate 46 has a plurality of reflective surfaces having a property of selectively reflecting color light within a predetermined wavelength range and transmitting light within other wavelength ranges. In the present embodiment, a reflective surface 48R for selectively reflecting red light, a reflective surface 48G for selectively reflecting green light, and a reflective surface 48B for selectively reflecting blue light are provided.

The reflective surfaces 48R, 48G, and 48B are arranged so that the reflection angles are different from each other. In the present embodiment, the reflective surface 48G for reflecting green light is arranged at an angle substantially perpendicular to the first reference axis A1. On the other hand, the reflective surface 48B for reflecting the reflective surface 48R and blue light reflecting red light are arranged at an angle oblique with respect to the first reference axis A1.

Figure 7:
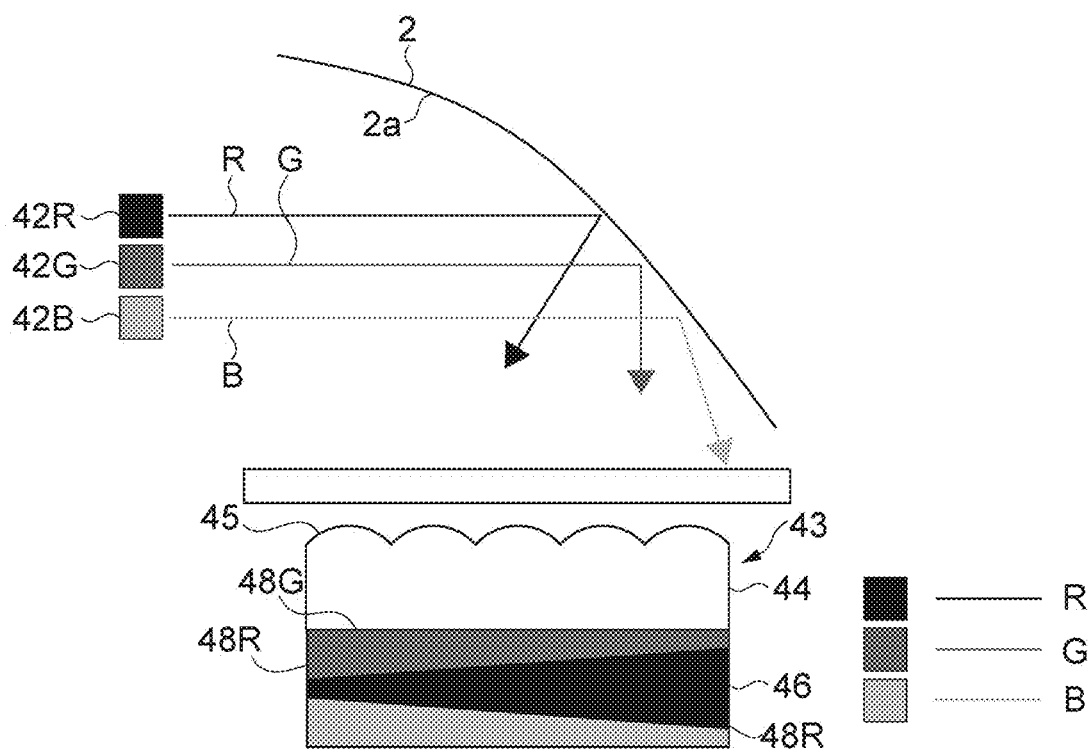
FIG. 7 is a diagram for explaining an emission direction of light of each color of RGB.

FIG. 7 is a diagram for explaining an emission direction of light of each color of RGB. In FIG. 7, only principal light rays are illustrated for red light R, green light G, and blue light B emitted from each of the red LED 42R, the green LED 42G, and the blue LED 42B. The principal light rays are light that travels through a center of the beams.

In FIG. 7, the condenser lens 3 functioning as the collimating optical system is not shown, and it is explained assuming that a conversion into the collimated light is performed with the optical surface 2a of the concave reflecting mirror 2. That is, in FIG. 7, the light reflected by the optical surface 2a of the concave reflecting mirror 2 becomes the principal light ray of each color light collimated.

As shown in FIGS. 6 and 7, in the present embodiment, it is assumed that the green light G emitted from the green LED 42G is collimated by the collimating optical system and is emitted substantially perpendicular to the reflective fly-eye lens 43 along the first reference axis A1.

In this case, the red light R emitted from the red LED 42R arranged at a different position is collimated by the collimating optical system. As shown in FIG. 7, the collimated red light R is emitted obliquely with respect to the reflective fly-eye lens 43 along a direction different from the emission direction of the green light G. Also for the blue light B emitted from the blue LED 42B arranged at a different position, the collimated blue light B is emitted obliquely with respect to the reflective fly-eye lens 43.

The reflective surfaces 48R, 48G, and 48B of the dichroic wedge plate 46 are arranged at angles corresponding to the emission directions of the collimated red light R, green light G, and blue light B, respectively. Specifically, the angles of the reflective surfaces 48R, 48G, and 48B are designed such that a plurality of light beams of the red light R divided by the optical surface 45, a plurality of light beams of the green light G divided by the optical surface 45, and a plurality of light beams of the blue light B divided by the optical surface 45 are condensed along a substantially equal direction and reflected.

In the present embodiment, the angle of each reflective surface is designed such that a plurality of light beams of each color emitted from the optical surface 45 proceeds in a substantially equal direction with reference to the first reference axis A1. This also corresponds to aligning the optical axis of each color light emitted from the optical surface 45 of the reflective fly-eye lens 43.

Thus, it becomes possible to superimpose the plurality of light beams of the respective colors on a substantially equal area of the image display surface 8a of the image display element 8. As a result, in the case of generating the color image by the field sequential method, it is possible to exhibit high illumination efficiency. For example, although, in each color light of RGB, the light in the area where the three colors do not overlap (area not become white upon combining) will not be used, in the present embodiment, it becomes possible to sufficiently suppress to generate such area. Further, it becomes possible to sufficiently prevent an occurrence of color unevenness due to the deviation of the optical axes of the respective colors of RGB.

The emission directions of the collimated red light R, green light G, and blue light B correspond to the positions where the red LED 42R, the green LED 42G, and the blue LED 42B are arranged. Accordingly, it can be said that the angles of the reflective surfaces 48R, 48G, and 48B are angles corresponding to the positions of the red LED 42R, the green LED 42G, and the blue LED 42B. Specific angles to be set are not limited and may be appropriately designed in accordance with the position of each light source, the direction of the optical axis to be aligned or the like.

In the present embodiment, the reflective surfaces 48R, 48G, and 48B of the dichroic wedge plate 46 are arranged so as to have different angles from each other corresponding to the positions of the plurality of light sources, and function as a plurality of reflective surfaces, each of which reflects a plurality of light beams emitted from the corresponding light source of the plurality of light sources and converged by the optical surface (i.e., being focused).

Fourth Embodiment

Figure 8:
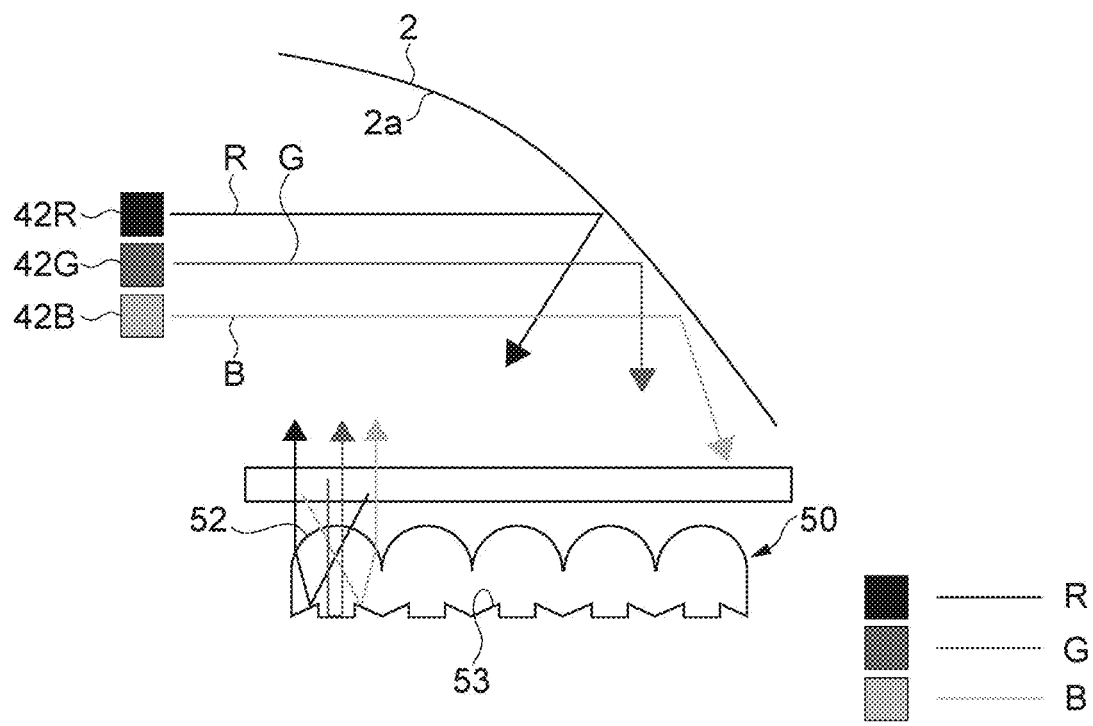
FIG. 8 is a schematic diagram showing a configuration example of a reflective fly-eye lens according to a fourth embodiment.
Figure 9:
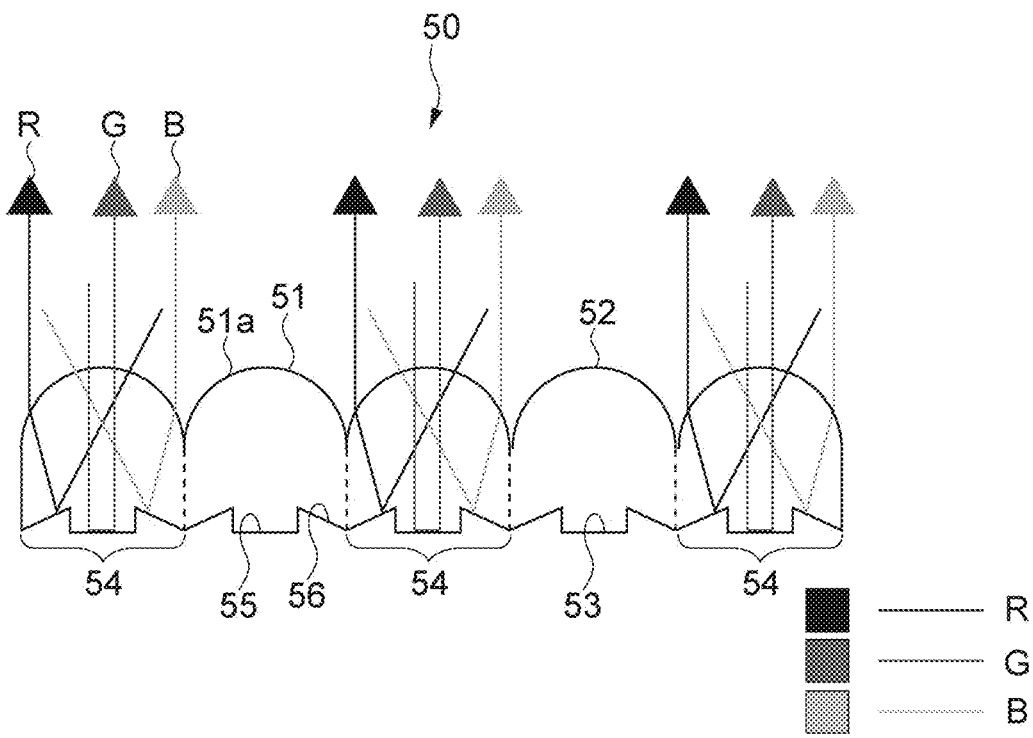
FIG. 9 is a schematic diagram showing a configuration example of a reflective fly-eye lens according to a fourth embodiment.

FIGS. 8 and 9 are diagrams schematically showing a configuration example of a reflective fly-eye lens according to a fourth embodiment of the present technology. For example, in the image display apparatus 300 shown in FIG. 6, a reflective fly eye lens 50 according to this embodiment can be used instead of the reflective fly eye lens 43 including the dichroic wedge plate 46.

The reflective fly-eye lens 50 has an optical surface 52 which is constituted by a lens surface 51a of each of the plurality of lenses 51. The reflective fly-eye lens 50 also has a reflective surface 53 arranged to face the optical surface 52. The reflective surface 53 has a plurality of reflecting areas 54 corresponding to the plurality of lenses 51.

As shown in FIG. 9, in the present embodiment, the shape of each reflecting area 54 is appropriately designed different from the planar shape. Specifically, in each reflective area 54, a planar portion 55 having a planar shape is formed in a center of the reflective area 54. The tapered surface portions 56 are formed extending obliquely from the center of the reflective area 54 toward each peripheral edge.

In FIGS. 8 and 9, the principal light rays of the red light R, the green light G, and the blue light B are illustrated. The green light G entered substantially perpendicular to the reflective fly-eye lens 50 converges toward each plane portion 55 of each reflecting area 54. Then, the green light G is reflected by each planar portion 55 and is emitted from each optical surface 52 along the first reference axis A1.

The red light R and the blue light B entered obliquely with respect to the reflective fly-eye lens 50 converge toward the tapered surface portions 56 and are converged after the reflection. Thus, along substantially the same direction as the green light G (along first reference axis A1), the red light R and blue light B are emitted from the optical surface 52.

Thus, in the present embodiment, the shape of the reflective area 54 is appropriately designed so that the optical axis of each color light emitted from the optical surface 52 of the reflective fly-eye lens 50 is substantially coaxial in accordance with a point at which each color light converges and a traveling direction of the light to be converged (typically, traveling direction of principal light rays).

This makes it possible to align the optical axes of the respective color lights without using the dichroic wedge plate 46 or the like. As a result, it becomes possible to exhibit high illumination efficiency, and to sufficiently suppress the occurrence of color unevenness.

The specific shape of each reflective area 54 is not limited to that shown in FIG. 9 and the like. In order to make the optical axes of the respective color lights substantially the same, it may be appropriately designed corresponding to the emission directions of the red light R, the green light G, and the blue light B collimated by the collimating optical system. This corresponds to designing the shapes of the respective reflective areas so as to have the shapes corresponding to the positions of the red LED 42R, the green LED 42G, and the blue LED 42B.

Figure 10A:
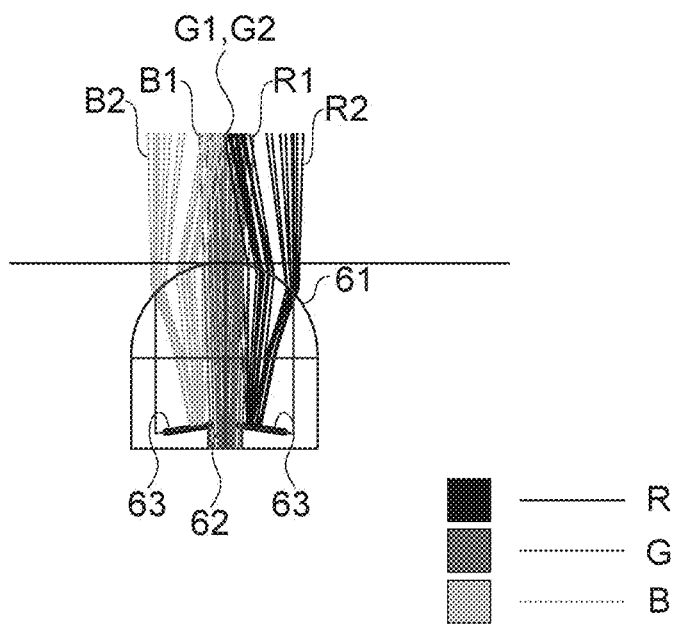
FIGS. 10A and 10B are schematic diagrams for explaining a simulation of a shape of a reflective area.
Figure 10B:
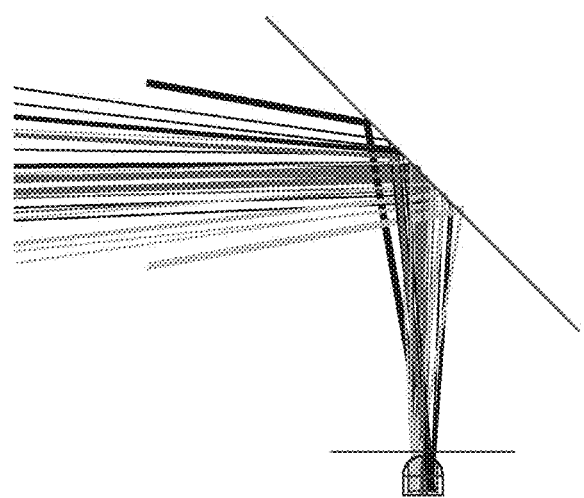

FIGS. 10A and 10B are schematic diagrams for explaining a simulation of the shape of the reflective area. As shown in FIG. 10A, the green light G1 is made to be entered substantially perpendicular to a center portion of a lens surface 61. The red light R1 and the blue light B1 are made to be entered obliquely at positions slightly offset from the center of the lens surface 61. Then, the position where the green light G1 is condensed is set near the lens surface 61 and the position where the red light R1 and the blue light B1 are respectively condensed are also set near the lens surface 61.

The green light G2 reflected by the planar portion 62 is emitted from the lens surface 61 along substantially the same direction as the green light G1 entered. The red lights R2 and B2 reflected by the tapered surface portion 63 are also emitted from the lens surface 61 along substantially the same direction as the green light G2. As shown in FIG. 10B, although the spread of the light beams is observed, it could be confirmed that the light of each color is emitted along the same direction as a whole, and the light is irradiated to substantially the same area as the white light in which three colors are combined. For example, by utilizing such a simulation, it is possible to design the shape of the reflective area with high accuracy.

Figure 11A:
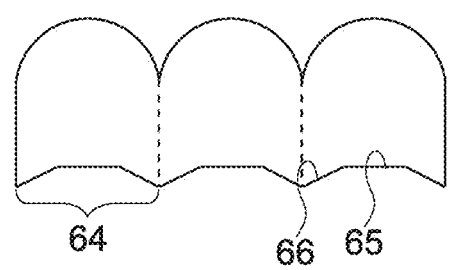
FIGS. 11A and 11B are schematic diagrams showing another configuration example of a reflective fly-eye lens.
Figure 11B:
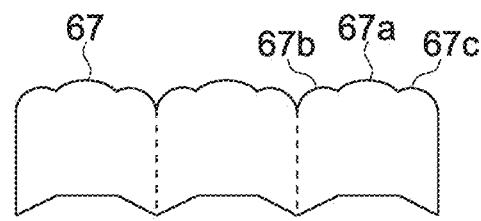

FIGS. 11A and 11B are schematic diagrams showing another configuration example of the reflective fly-eye lens. In the example shown in FIG. 9, the planar portion 55 and the tapered surface portion 56 are formed so that a recess is formed in the center of the reflective area 54. On the other hand, as shown in FIG. 11A, the flat portion 65 and the tapered surface portion 66 may be formed so that the reflective area 64 has a convex shape as a whole. In addition, the tapered surface portion 66 may be configured to have an opposite slope. Specifically, the tapered surface portion 56 may be formed so that the height is increased from the center toward the peripheral edge of the reflective area.

As shown in FIG. 11B, the shape of the lens surface 67 may be designed for optical axis alignment of each color light. In FIG. 11B, for each of areas 67a, 67b, and 67c where each color light of RGB is entered, the shape is designed to match each color. In addition, any design may be utilized, e.g., designing the radius of curvature of the lens surface, making the lens surface aspherical for each color, making the lens to have a free-form surface, and others.

Other Embodiments

The present technology is not limited to the embodiments described above, and can realize various other embodiments.

Figure 12A:
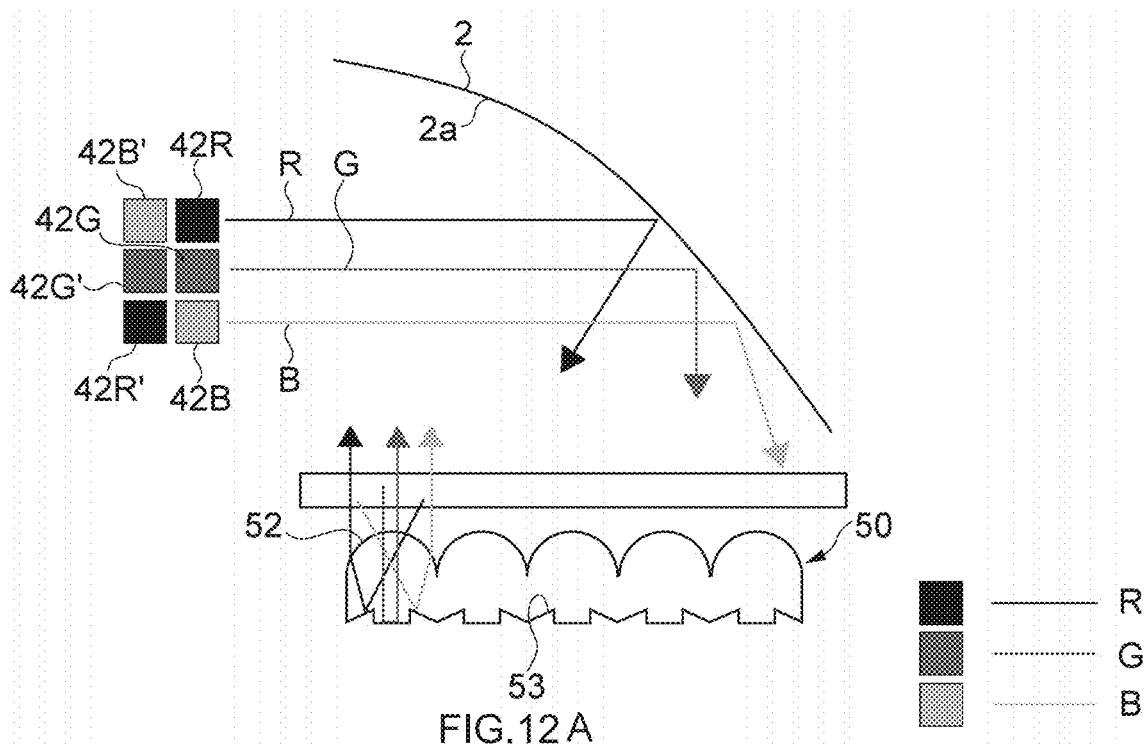
FIGS. 12A and 12B are schematic diagrams showing a modification of the image display apparatus shown in FIG. 8.
Figure 12B:
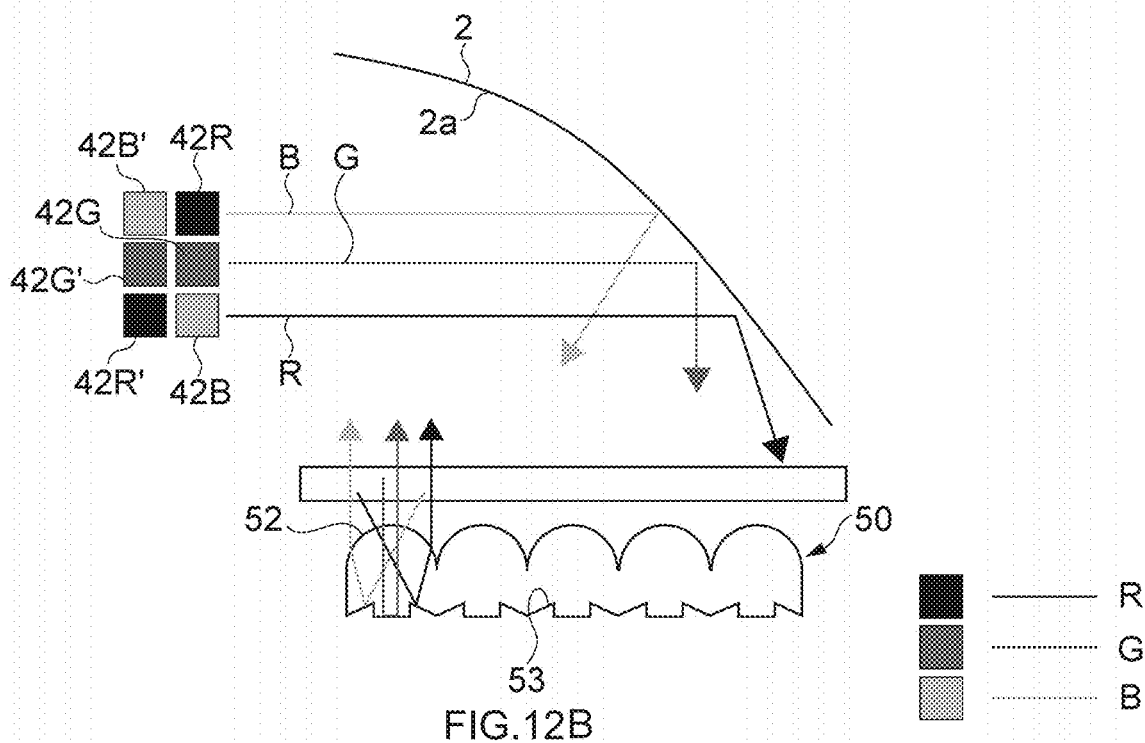

FIGS. 12A and 12B are schematic diagrams showing a modification of the image display apparatus shown in FIG. 8. In the image display apparatus shown in FIGS. 12A and 12B, as the light source section, the LED array light source is used.

As shown in FIGS. 12A and B, the LED array light source includes rows in the order of the red LED 42R, the green LED 42G, and the blue LED 42B, and rows in the order of a blue LED 42B', a green LED 42G', and a red LED 42R'. Note that, in FIGS. 12A and B, two rows are shown side by side in the drawing, in practice, two rows are arranged along the vertical direction of the paper surface (depth direction).

FIG. 12A is a diagram showing the principal light rays of RGB lights emitted from the rows in the order of the red LED 42R, the green LED 42G, and the blue LED 42B. FIG. 12B is a diagram showing the principal light rays of RGB lights emitted from the rows in the order of the blue LED 42B', the green LED 42G', and the red LED 42R'.

Since the respective LEDs are arranged so that the positions of the red LED and the blue LED are reversed in the two rows, the positions of the red light R and the blue light B emitted from the optical surface 52 of the reflective fly-eye lens 50 (positions of light beams) are also reversed. This makes it possible to sufficiently suppress bias of each light of RGB superimposed on the image display surface of the image display element and to display a high-quality image. Thus, by appropriately designing the configuration of the light source section in accordance with the design of the reflective fly-eye lens, it is possible to improve the quality. Note that it also becomes possible to control the width and the like of the light beam for each color.

In the above, a polarizing element is used as an element that reflects light emitted from the light source section and transmits the plurality of light beams emitted from the reflective fly-eye lens. It is not limited to this and other optical elements such as a half mirror may be used.

In the above, the LED light sources of RGB are mentioned as an example as the plurality of light sources arranged in different positions from each other. It is not limited to this, any light source of any color may be used as the plurality of light sources.

In the above, although an example in which two reflective fly-eye lenses are used, three or more reflective fly-eye lenses may be used. In addition, the reflective fly-eye lens according to the present technology may be prepared for each color of RGB, and the respective plurality of light beams of RGB emitted from each reflective fly-eye lens may be coaxially aligned.

Each configuration of the image display apparatus, the light source section, the reflective fly-eye lens, the collimating optical system, the illumination optical system, the beam splitter, and the like described with reference to the drawings are merely one embodiment, and can be arbitrarily modified without departing from the scope of the present technology. That is, any other configuration for practicing the present technology may be employed.

In the present disclosure, "center", "middle", "uniform", "equal", "vertical", "collimated", "parallel", "planar shape", "coplanar", "same direction", and the like are concepts that include "substantially center", "substantially middle", "substantially uniform", "substantially equal", "substantially vertical", "substantially collimated", "substantially parallel", "substantially planar shape", "substantially coplanar", and "substantially same direction." For example, it also includes states included in a predetermined range (e.g., ±10% range) with reference to "completely center", "completely middle", "completely uniform", "completely equal", "completely perpendicular", "completely collimated", "completely parallel", "completely planar shape", "completely coplanar", "completely same direction", or the like are also included.

At least two of the features of the present technology described above can also be combined. In other words, various features described in the respective embodiments may be combined discretionarily regardless of the embodiments. Further, the various effects described above are not limitative but are merely illustrative, and other effects may be provided.

The present technology may also have the following structures.

(1) An image display apparatus, including:
 a light source section; and one or more optical components that include an optical surface for dividing light emitted from the light source into a plurality of light beams to be converged and a reflective surface for reflecting the plurality of light beams converged by the optical surface, and emit the plurality of light beams reflected by the reflective surface from the optical surface.

(2) The image display apparatus according to (1), in which the optical surface is configured of a lens surface of each of a plurality of lenses arranged two-dimensionally, and the reflective surface reflects the light beam converged by each of the plurality of lenses toward the lens surface of each of the plurality of lenses.

(3) The image display apparatus according to (2), in which the reflective surface is arranged so as to position a focal plane of each of the plurality of lenses in a vicinity of each surface of the plurality of lenses.

(4) The image display apparatus according to any one of (1) to (3), in which the optical surface and the reflective surface are arranged to face each other.

(5) The image display apparatus according to any one of (1) to (4), in which the optical surface and the reflective surface are integrally formed.

(6) The image display apparatus according to any one of (1) to (5), further including:
a collimating optical system for converting the light emitted from the emitting section into collimated light and guiding the collimated light into the optical surface.

(7) The image display apparatus according to any one of (1) to (6), further including:
an image display element; and
an illumination optical system that guides the plurality of the light beams emitted from the optical component to the image display surface of the image display element.

(8) The image display apparatus according to (7), in which the illumination optical system superimposes the plurality of the light beams emitted from the optical component on the image display surface.

(9) The image display apparatus according to any one of (1) to (8), in which the reflective surface has a plurality of reflective areas that reflect each of the plurality of light beams.

(10) The image display apparatus according to (9), in which the plurality of reflective areas has the same shape each other.

(11) The image display apparatus according to (9) or (10), in which each of the plurality of reflective areas has a planar shape.

(12) The image display apparatus according to (9) or (10), in which the light source section has a plurality of light sources arranged at different positions from each other, and each of the plurality of reflective areas has a shape corresponding to a positional relationship of the plurality of light sources.

(13) The image display apparatus according to (12), in which each of the plurality of reflective areas has a planar portion in a planar shape formed in a center of the reflective area, and a tapered surface portion extending obliquely from the center of the reflective area to a peripheral edge.

(14) The image display apparatus according to any one of (1) to (8), in which the light source section has a plurality of light sources arranged at different positions from each other, and the optical components are arranged so as to have different angles from each other corresponding to the positions of the plurality of light sources and have a plurality of reflective surfaces, each of which reflects the plurality of light beams emitted from the corresponding light source of the plurality of light sources and converged by the optical surface.

(15) The image display apparatus according to any one of (1) to (14), in which the one or more optical components include first and second optical components, and further comprising a beam splitter that splits the light emitted from the light source section, emits the light to each of the first and second optical components, and combines the plurality of light beams emitted from each of the first and second optical components.

REFERENCE SIGNS LIST 1 light source
2 concave reflecting mirror
2a optical surface of concave reflecting mirror
3, 4, 28, 29, 33, 34 condenser lens
5, 24, 25 quarter-wave plate (QWP)
6, 43, 50 reflective fly eye lens
7 polarizing beam splitter (PBS)
7a optical surface of PBS 7
7b first plane perpendicular to first reference axis A1 of PBS 7
7c second plane perpendicular to second reference axis A2 of PBS 7
8, 31 image display element
8a, 31a image display surface
9, 32 projection lens
12, 45, 52 optical surface of reflective fly eye lens
13, 53 reflective surface of reflective fly eye lens
14a, 51a, 61, 67 lens surface
14, 51 lens
15, 54, 64 reflective area
21, 41 light source
22 collimating lens
23 PBS
23a optical surface
26 first reflective fly-eye lens
26a optical surface of first reflective fly eye lens
27 second reflective fly-eye lens
27a optical surface of second reflective fly eye lens
30 TIR prism
42R, 42R' red LED
42B, 42B' blue LED
42G, 42G' green LED
44 lens body of reflective fly eye lens 44
46 dichroic wedge plate
48R, 48G, 48B reflective surface
55, 62, 65 planar portion
56, 63, 66 tapered surface
60 projected object (screen, etc.)
67a, 67b, 67c area where light of each color of RGB is entered
100, 200, 300 image display apparatus

What is claimed is:
1. An image display apparatus, comprising:
a light source section;
a concave mirror that reflects light emitted from the light source section towards one or more optical compo- nents, wherein the concave mirror is disposed between a first condenser lens and a second condenser lens; and the one or more optical components, including:

an optical surface that divides the light emitted from the light source section into a plurality of light beams; and a reflective surface for reflecting the plurality of light beams converged by the optical surface and emitting the plurality of light beams reflected by the reflective surface from the optical surface, wherein the one or more optical components include a first optical component and a second optical component, and a beam splitter that splits the light emitted from the light source section to each of the first optical component and the second optical component, and combines the plurality of light beams reflected from each of the first optical component and the second optical component.

2. The image display apparatus according to claim 1, wherein the optical surface is configured of a plurality of lenses arranged two-dimensionally, and wherein the reflective surface reflects the plurality of light beams converged by each of the plurality of lenses toward a lens surface of each of the plurality of lenses.

3. The image display apparatus according to claim 2, wherein the reflective surface is arranged so as to position a focal plane of each of the plurality of lenses in a vicinity of each surface of the plurality of lenses.

4. The image display apparatus according to claim 1, wherein the optical surface and the reflective surface are arranged to face each other.

5. The image display apparatus according to claim 1, wherein the optical surface and the reflective surface are integrally formed.

6. The image display apparatus according to claim 1, further comprising:

a collimating optical system for converting the light emitted from the light source section into collimated light and guiding the collimated light into the optical surface.

7. The image display apparatus according to claim 1, further comprising:

an image display element; and an illumination optical system that guides the plurality of light beams reflected from the one or more optical components to an image display surface of the image display element.

8. The image display apparatus according to claim 7, wherein the illumination optical system superimposes the plurality of light beams reflected from the one or more optical components on the image display surface.

9. The image display apparatus according to claim 1, wherein the reflective surface has a plurality of reflective areas that reflect each of the plurality of light beams.

10. The image display apparatus according to claim 9, wherein each of the plurality of reflective areas has a same shape.

11. The image display apparatus according to claim 9, wherein each of the plurality of reflective areas has a planar shape.

12. The image display apparatus according to claim 9, wherein the light source section has a plurality of light sources arranged at different positions from each other, and wherein each of the plurality of reflective areas has a shape corresponding to a positional relationship of the plurality of light sources.

13. The image display apparatus according to claim 12, wherein each of the plurality of reflective areas has a planar portion in a planar shape formed in a center of each of the plurality of reflective areas, and a tapered surface portion extending obliquely from the center of each of the plurality of reflective areas to a peripheral edge.

14. The image display apparatus according to claim 1, wherein the light source section has a plurality of light sources arranged at different positions from each other, and wherein the one or more optical components are arranged so as to have different angles from each other corresponding to positions of the plurality of light sources and have a plurality of reflective surfaces, each of which reflects light emitted from a corresponding light source of the plurality of light sources.

* * * * *